June 26, 1956 J. F. KINKEL 2,752,567
ANGULAR VELOCITY MEASUREMENT APPARATUS
Filed March 21, 1952
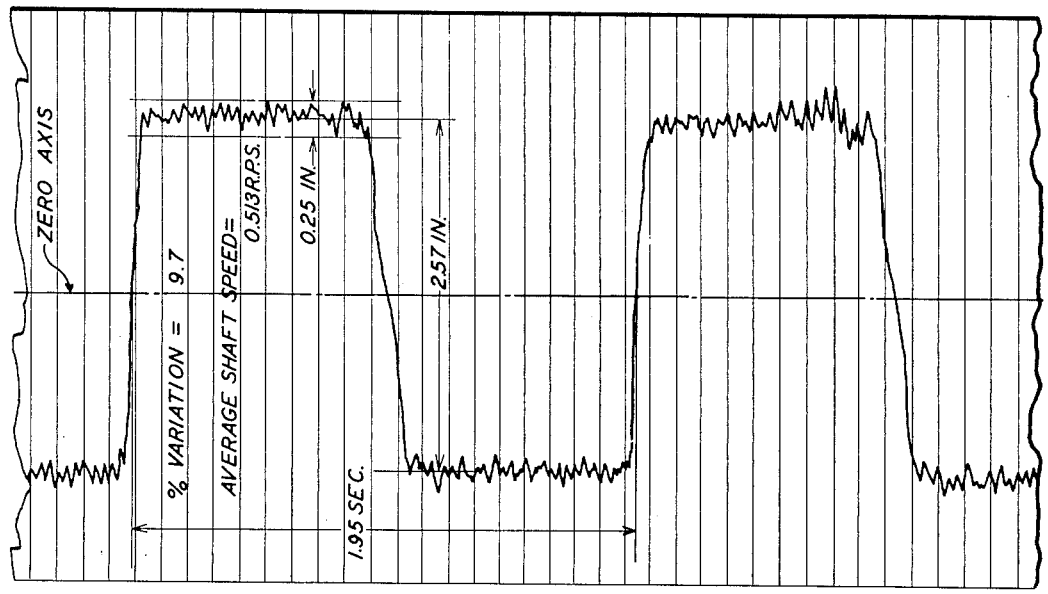
FIG. 3.
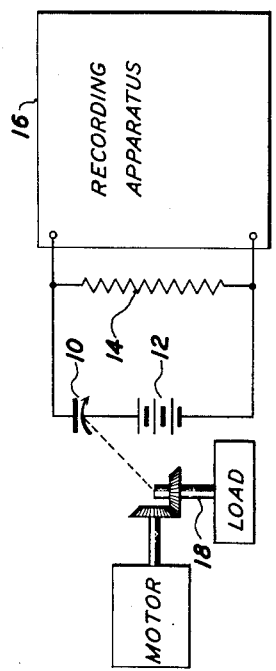
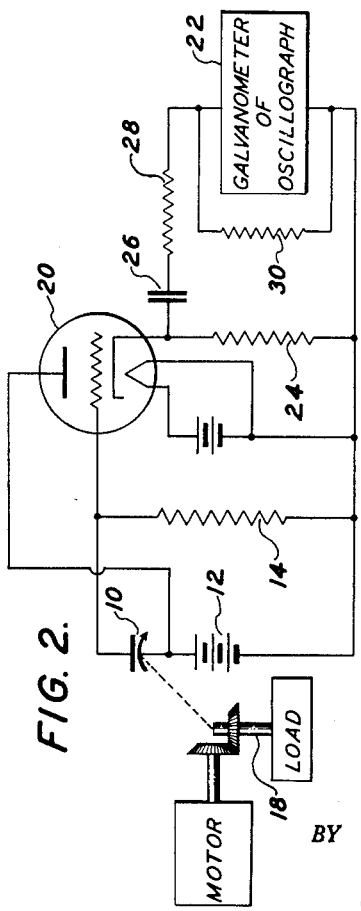
INVENTOR.
JOHN F. KINKEL
BY
James B. Christie
ATTORNEY

United States Patent Office 2,752,567
Patented June 26, 1956

2,752,567

ANGULAR VELOCITY MEASUREMENT APPARATUS

John F. Kinkel, Pasadena, Calif., assignor, by mesne assignments, to Consolidated Electrodynamics Corporation, Pasadena, Calif., a corporation of California Application March 21, 1952, Serial No. 277,874

5 Claims. (Cl. 324—70)

This invention relates to apparatus for measuring the angular velocity of a rotatable member. The apparatus is particularly suitable for measuring variations in the instantaneous angular velocity of a rotating member.

The apparatus comprises a transducer coupled to the rotatable member, and an electric circuit connected to the transducer. The apparatus serves to produce an output signal having a wave form which is substantially a square wave, with one cycle of the square wave corresponding to one revolution of the rotatable member. The variations in the instantaneous amplitude of the square wave provide a measure of the variations in the instantaneous angular velocity of the rotatable member.

The transducer is a variable condenser which may be coupled to the rotatable member so that the time rate of change of capacitance of the condenser is a function of the angular velocity of the member. A source of potential and a resistor are connected in series with the variable condenser in a closed loop, and a recording device is coupled to the resistor for providing an indication of the variations in the voltage developed across the resistor. Preferably, the recording device is an oscillograph which provides a record of the variations in the voltage developed across the resistor with respect to time.

The invention is explained with reference to the drawings, in which:

Fig. 1 is a schematic diagram of the apparatus of the invention;

Fig. 2 is a schematic diagram showing one arrangement for coupling the apparatus of the invention to a galvanometer in a recording oscillograph; and Fig. 3 shows a typical record obtained with the apparatus of my invention.

Referring to Figs. 1 and 2, a variable condenser 10, a source of potential 12, and a resistor 14 are all connected in series in a closed loop. A recording apparatus 16, such as an oscilloscope or an oscillograph, is connected across the resistor 14 for providing an indication of the variations in the voltage developed across the resistor.

In order to measure the angular velocity of a rotatable member, the variable control of the condenser 10 is coupled to the member so that the time rate of change of the capacitance of the condenser is a function of the angular velocity of the member. As illustrated in the drawings, the variable control of the condenser 10 is coupled to a shaft 18 so that the apparatus serves to measure the angular velocity of the shaft.

For operation at moderate speeds, the condenser 10 may be a conventional type having a rotatable rotor and providing a capacitance which varies linearly with angular movement of the rotor. For high speed operation, a dynamically balanced variable capacitor capable of sustained operation at high rotational speeds should be provided.

In order to provide accurate measurements of variations in the instantaneous angular velocity, the resistance of the resistor and the capacitance of the condenser should be proportioned so that the product of the resistance of the resistor in ohms and the rate of change of the capacitance in farads per second is small compared to unity. Preferably, the product of the resistance and the time rate of change of the capacitance are of the order of $10^{-3}$.

With such an arrangement, the voltage which is developed across the resistor 14 is determined by the following equation:

$$v(t) = ER\dot{c}(t)$$

where $v(t)$ is the voltage developed across the resistor 14.
E is the voltage of the source 12.
R is the resistance of the resistor 14 in ohms.
$\dot{c}(t)$ is the rate of change of capacitance of the condenser 10 in farads per second.

Under these conditions, the magnitude of the voltage developed across the resistor 14 during each half-cycle of operation is directly proportional to the angular velocity of the shaft 18, and instantaneous variations in the angular velocity of the shaft cause variations in the amplitude of the signal produced across the resistor 14. The magnitude of these variations in the signal provides a measure of the variations in the instantaneous angular velocity of the shaft.

Fig. 3 shows a typical oscillograph record produced by the apparatus of my invention. The wave form of the signal produced by the apparatus is approximately a square wave because of the polarity reversal which occurs as the variable condenser passes through minimum and maximum capacitance. Thus, one cycle of the square wave corresponds to one revolution of the shaft.

The average angular velocity of the shaft is computed by measuring the time required for one revolution of the shaft, i. e., by measuring the period of one cycle of the square wave.

The instantaneous variations in the angular velocity of the shaft cause irregularities in the wave form of each half-cycle of the square wave. Outside of the regions of discontinuity caused by the polarity reversals, the instantaneous amplitude of the waveshape as measured from the zero axis of the wave is directly proportional to the instantaneous angular velocity at that point in time.

The average double amplitude of the square corresponds to twice the average angular velocity of the shaft, so that if the double amplitude of the variation is divided by the average double amplitude of the square wave, the per unit value of the instantaneous variations is obtained.

For example, if the average double amplitude of the square wave is 2.57" as shown in Fig. 3, and the average double amplitude of the variations in the square wave is 0.25", the per cent variation is 9.7.

Fig. 2 is a schematic diagram showing one arrangement for coupling the output signal which is produced across the resistor 14 to the galvanometer of a recording oscillograph.

A vacuum tube 20 serves as a cathode-follower amplifier having its input circuit connected across the resistor 14 and its output circuit coupled to a galvanometer 22. The anode of the tube 20 is connected to the positive terminal of the source of potential 12 so that the one source of potential serves both to supply voltage for the anode of the tube 20 and to supply voltage for the serially connected condenser 10 and resistor 14.

The output signal of the amplifier is produced across a cathode resistor 24, and it is coupled to the galvanometer through a condenser 26 and a resistor 28. A damping resistor 30 is connected in shunt with the galvanometer 22.

Circuit constants for the arrangement shown in Fig. 2 which are suitable for making records of the type shown in Fig. 3 are as follows:

$$C_{10} = 240 \; \mu\mu f.$$
$$C_{26} = 4,000 \; \mu f.$$
$$R_{14} = 10,000 \; ohms$$
$$R_{24} = 1,000 \; ohms$$
$$R_{28} = 3,300 \; ohms$$
$$R_{30} = 350 \; ohms$$
$$V_{12} = 90 \; volts$$
$$VT_{20} = 6J5\text{---}GT$$

It will be apparent that the circuit constants for the elements 26, 28 and 30 are dependent upon the characteristics of the galvanometer 22, and that these circuit constants must be determined for the particular type of galvanometer used.

The apparatus may be employed to make measurements over a wide range of angular velocities. The low frequency response of the apparatus is limited only by the frequency response of the recording apparatus and the amplifier which is ordinarily employed between the resistor 14 and the recording apparatus. The high frequency response of the apparatus is determined primarily by the mechanical rigidity of the condenser 10 and the mechanical coupling between the condenser 10 and the rotating member.

The apparatus may also be used for measurement of the relative angular velocity of two rotating shafts by connecting a variable capacitor between the two shafts so that the time rate of change of capacitance is a function of the differential angular velocity.

I claim:

1. Apparatus for providing an indication of instantaneous variations in the angular velocity of a rotatable member comprising a condenser, a resistor, and a source of D. C. potential all connected in series in a closed circuit, means connected across the resistor for providing an indication of variations in the current which flows through the series circuit with respect to time, the condenser having a rotatable rotor and providing a capacitance which varies substantially linearly with angular movement of its rotor, and means for coupling the rotor of the condenser to the rotatable member to cause the rotation of the rotor to be a known function of the rotation of the member and provide cyclical variations in the capacitance of the condenser, the product of the rate of change of the capacitance of the condenser in farads per second and the resistance of the resistor in ohms being less than unity, whereby the waveform of the signal which is produced across the resistor is approximately a square wave due to the polarity reversal which occurs as the capacitance of the condenser passes through the minimum and maximum conditions, and variations in the flat-tops of each half-cycle of the square wave due to instantaneous variations in the linear change of capacitance provide an indication of instantaneous variations in the angular velocity of the rotatable member.

2. Apparatus for providing an indication of variations in the instantaneous angular velocity of a rotatable member comprising a condenser, a source of D. C. potential, and a resistor all connected in series in a closed loop, the condenser having a rotatable rotor and providing a capacitance which varies substantially linearly with angular movement of its rotor, means for coupling the rotor of the condenser to the rotatable member to cause the rotation of the rotor to be a known function of the rotation of the member and provide cyclical variations in the capacitance of the condenser, the product of the resistance of the resistor in ohms and the rate of change of capacitance of the condenser in farads per second being small compared to unity, and an oscillograph having its input circuit connected across the resistor for providing an indication of the variations in the voltage developed across the resistor with respect to time.

3. Apparatus for providing an indication of instantaneous variations in the angular velocity of a rotatable member comprising a condenser, a resistor, and a source of D. C. potential all connected in series in a closed circuit, means connected across the resistor for providing an indication of variations in the current which flows through the series circuit with respect to time, and means for varying the capacitance of the condenser cyclically in accordance with the angular movement of the rotatable member to cause the wave form of the signal which is produced across the resistor to be approximately a square wave due to the polarity reversal which occurs as the capacitance of the condenser passes through the minimum and maximum capacitance conditions for the condenser.

4. Apparatus for providing an indication of instantaneous variations in the angular velocity of a rotatable member comprising a variable condenser, a resistor, and a source of D. C. potential all connected in series in a closed circuit, means coupled to the series circuit for providing an indication of variations in the current which flows through the series circuit with respect to time, and means for coupling the condenser to the rotatable member and causing the capacitance of the condenser to vary cyclically in accordance with a known function of the rotation of the member to cause the wave form of the signal which is produced in the series circuit to be approximately a square wave due to the polarity reversal which occurs as the capacitance of the condenser passes through minimum and maximum capacitance conditions for the condenser, so that instantaneous variations in the change of capacitance cause variations in the magnitude of the signal during half-cycles of the square wave.

5. In apparatus for providing an indication of instantaneous variations in the angular velocity of a rotatable member, a variable condenser, a resistor, and a source of D. C. potential all connected in series in a closed circuit, the condenser having a rotatable rotor and providing a capacitance which varies substantially linearly with angular movement of its rotor, and means for coupling the rotor of the condenser to the rotatable member to cause the rotation of the rotor to be a known function of the rotation of the member and provide cyclical variations in the capacitance of the condenser, the product of the rate of change of the capacitance of the condenser in farads per second and the resistance of the resistor in ohms being less than unity, whereby the wave form of the signal which is produced across the resistor is approximately a square wave due to the polarity reversal which occurs as the capacitance of the condenser passes through the minimum and maximum conditions, and instantaneous variations in the linear change of capacitance cause variations in the magnitude of the signal during half-cycles of the square wave.

References Cited in the file of this patent

UNITED STATES PATENTS

| Number | Name | Date |
| --- | --- | --- |
| 1,951,226 | Wold | Mar. 13, 1934 |
| 2,250,258 | Firestone | July 22, 1941 |
| 2,413,391 | Usselman | Dec. 31, 1946 |
| 2,417,452 | Stiefel | Mar. 18, 1947 |
| 2,455,345 | Watt | Nov. 20, 1948 |
| 2,502,712 | Floyd | Apr. 4, 1950 |

OTHER REFERENCES

"Capacity Transducer," article in Radio News of September 1948, pp. 6, 7, 30 and 31.